United States Patent [19]

Frazer

[11] 4,065,431
[45] Dec. 27, 1977

[54] THERMALLY STABLE, RIGID POLYESTERS FROM AROMATIC DIBASIC ACIDS AND THERMALLY STABLE, RIGID DIOLS

[75] Inventor: August Henry Frazer, Wilmington, Del.

[73] Assignee: E. I. Du Pont de Nemours and Company, Wilmington, Del.

[21] Appl. No.: 751,087

[22] Filed: Dec. 16, 1976

[51] Int. Cl.² ............................................. C08G 63/66
[52] U.S. Cl. ................................. 260/47 C; 260/75 R
[58] Field of Search ............................ 260/75 R, 47 C

[56] References Cited

U.S. PATENT DOCUMENTS

| | | | |
|---|---|---|---|
| 3,477,989 | 11/1969 | Zorn et al. | 260/47 C |
| 3,498,952 | 3/1970 | Wiener | 260/75 R |
| 3,522,217 | 7/1970 | Weimar | 260/75 R |

*Primary Examiner*—Lucille M. Phynes

[57] ABSTRACT

Rigid polyesters of the formula

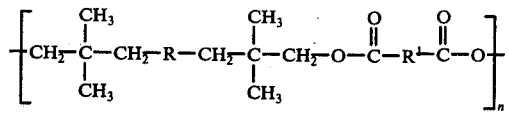

where R and R¹ are each arylene or substituted arylene and $n$ is at least about 10 have a combination of being thermally stable and melt spinnable.

9 Claims, No Drawings

THERMALLY STABLE, RIGID POLYESTERS FROM AROMATIC DIBASIC ACIDS AND THERMALLY STABLE, RIGID DIOLS

BACKGROUND OF THE INVENTION

1. Field of the Invention

This invention is concerned with thermally stable, high tenacity, high modulus polyesters prepared from aromatic dibasic acids and aromatic-aliphatic diols containing no hydrogen atoms beta to the hydroxyl groups.

2. Description of the Prior Art

Polyester fibers such as those spun from polyethylene terephthalate have found wide commercial acceptance. These fibers, generally, however, have limited thermal stability. A major pathway for thermal decomposition of known aliphatic-aromatic polyesters is thermal elimination at the site of aliphatic beta-hydrogens.

Polyesters having improved thermal stability have been prepared from terephthalic acid and neopentyl glycol. These polymers do not contain aliphatic beta-hydrogens. Such polyesters are described in British Pat. No. 828,922, French Pat. No. 1,392,313 and U.S. Pat. Nos. 3,194,794 and 3,498,952. These polyesters, however, are amorphous and thus have limited strength as fibers.

It would be desirable to provide new polyesters of superior thermal stability which could be melt spun into fibers characterized by high tenacity and high modulus. Such fibers would be useful, for example, as tire cords.

SUMMARY OF THE INVENTION

There have now been discovered thermally stable, rigid polyesters of the formula

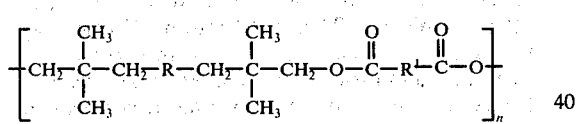

where R is an arylene selected from the group consisting of 1,4-phenylenes, 4,4'-biphenylenes and 2,6-naphthylenes, said arylene being unsubstituted or substituted with halo, lower alkyl or phenyl, $R^1$ is an arylene selected from the group consisting of 1,4-phenylenes, 4,4'-biphenylenes, 4,4'-biphenyleneoxides, and 2,6-naphthylenes, said arylene being unsubstituted or substituted with halo, lower alkyl or phenyl, and n is at least about 10.

The term "rigid" is used to denote the presence of a sufficient quantity of aromatic rings in the backbone of the polymer to provide stiffness. The term "halo" is intended to include chloro, bromo, fluoro and iodo. The term "lower alkyl" is intended to include alkyls of 1 to 6 carbons. In the above definition of R and $R^1$, the substituted phenylene may have 1 to 4 of the specified substituents, the substituted biphenylene may have 1 to 8 of these substituents, and the substituted naphthylene may have 1 to 6 of these substituents.

DESCRIPTION OF THE PREFERRED EMBODIMENT

The polyesters of this invention are prepared by the reaction of an aromatic dibasic acid or diester of the formula

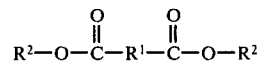

where $R^2$ is H, lower alkyl or phenyl and $R^1$ is as defined above, with a rigid diol of the formula

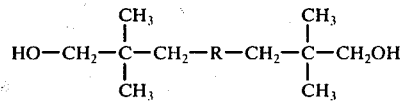

in which R is as defined above.

Suitable aromatic dibasic acids and diesters for preparing the polyesters of this invention include
  terephthalic acid
  chloroterephthalic acid
  methylterephthalic acid
  ethylterephthalic acid
  dimethyl terephthalate
  dimethyl chloroterephthalate
  dimethyl methylterephthalate
  diethyl terephthalate
  diethyl 2-chloroterephthalate
  diphenyl terephthalate
  diphenyl 2-chloroterephthalate
  diphenyl 2-methylterephthalate
  tetrafluoroterephthalic acid
  tetrachloroterephthalic acid
  tetrabromoterephthalic acid
  tetraiodoterephthalic acid
  tetramethylterephthalic acid
  2,5-diphenylterephthalic acid
  4,4'-biphenyldicarboxylic acid
  dimethyl ester of 4,4'-biphenyldicarboxylic acid
  2,2',3,3',5,5',6,6'-octafluoro-4,4'-biphenyldicarboxylic acid
  2,2'-dibromo-4,4'-biphenyldicarboxylic acid
  2,2',6,6'-tetrachloro-4,4'-biphenyldicarboxylic acid
  2,2'-diiodo-4,4'-biphenyldicarboxylic acid
  2,2'-dimethyl-4,4'-biphenyldicarboxylic acid
  4,4'-oxydibenzoic acid
  3,3'-dimethyl-4,4'-oxydibenzoic acid
  diphenyl ester of 4,4'-oxydibenzoic acid
  2,6-naphthalenedicarboxylic acid
  dimethyl ester of 2,6-naphthalenedicarboxylic acid
  2-methyl-4,4'-diphenyldicarboxylic acid
  diethyl ester of 2,6-naphthalenedicarboxylic acid
  diphenyl ester of 2,6-naphthalene dicarboxylic acid
  1,3,4,5,7,8-hexachloro-2,6-naphthalenedicarboxylic acid and the like. These dibasic acids are all well known. The lower alkyl and phenyl esters are readily prepared from the acids by known procedures.

The rigid diols used to prepare the polyesters of this invention are prepared by reacting a lower alkyl isobutyrate such as methyl isobutyrate with an α,α'-dibromo aromatic compound such as α,α'-dibromo-p-xylene in the presence of the reaction product of a lower alkyllithium such as n-butyllithium with a hindered secondary amine such as diisopropylamine to form a 1,4-bis(2-carbomethoxy-2-methylpropyl)benzene in accordance with the equation:

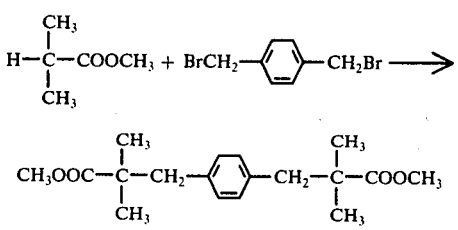

This product is then reduced with lithium aluminum hydride to form the rigid diol in accordance with the equation:

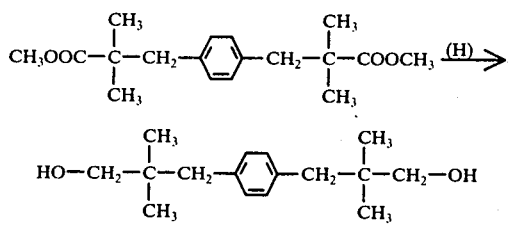

The various different arylene groups are obtained by substituting a different α,α'-dibromo aromatic compound for the α,α'-dibromo-p-xylene. Suitable α,α'-dibromo aromatic compounds include α,α'-dibromo-p-xylene
α,α'-dibromo-p,p'-bitolyl
2,6-bis(bromomethyl)naphthalene
α,α'-dibromo-2-chloro-p-xylene
α,α'-dibromo-2-methyl-p-xylene
α,α',2-tribromo-p-xylene
2,5-bis(bromomethyl)biphenyl
4,4'-bis(bromomethyl)-3,3'-difluorobiphenyl
3,6-bis(chloromethyl)durene
3,3'-dichloro-4,4'-bis(bromomethyl)biphenyl
1,5-dichloro-2,6-bis(bromomethyl)naphthalene
1-chloro-2,6-bis(bromomethyl)naphthalene
and the like.

The polyesters of this invention are prepared by melt polymerization, that is, heating the aromatic dibasic acid or diester and the rigid diol at a temperature above the melting point of the ingredients in the presence of tetraisopropyl titanate. The dibasic acid is generally used rather than the diester since the reaction is faster with the acid. Esters can be used where a lower melting reactant is desired.

The polyesters of this invention are characterized by superior thermal stability, high tenacity and high stiffness modulus. A contributing factor in the superior thermal stability is the absence of β-hydrogens in the aliphatic portions of the molecule. These polyesters have superior thermal stability in high temperature melt polymerizations, in high temperature melt spinning, and in extrusion operations.

The chain stiffness or rigidity imparted by the aromatic segments in the polymers contributes to the high tenacity and high stiffness modulus of fibers spun from the polymers. Some of these polymers yield oriented fibers directly from melt spinning. A particularly preferred group of the polymers of this invention are those having glass transition temperatures above 150° C since fibers of these polymers can demonstrate the practical advantages of high strength and high modulus at elevated temperatures. The polyesters of this invention are especially useful for preparing tire cords.

EXAMPLES OF THE INVENTION

The following examples illustrate the preparation and use of the thermally stable, rigid polyesters of this invention. In the examples the following tests and designations were employed.

Polymer melt temperature (PMT) is that temperature at which a fresh polymer sample leaves a wet molten trail when stroked with moderate pressure across a clean, heated metal surface. A temperature-gradient bar covering the range of 50°-400° C was used for this determination (Beaman and Cramer, J. Polymer Sci., XXI, pg 227).

Inherent viscosity was determined at 0.5% concentration and 30° C in a 40/60 weight mixture of 1,1,2,2-tetrachloroethane and phenol.

The standard fiber test designation T/E/Mi refers to tensile strength in grams per denier, elongation in percent, and initial modulus in grams per denier.

Orientation angle was determined by the method described by Kwolek in U.S. Pat. No. 3,671,542 at Column 20, lines 8-41.

EXAMPLE 1

Part A

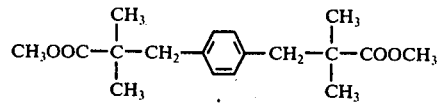

To 1 liter of dry tetrahydrofuran was added 52 g of diisopropylamine. The mixture was cooled to −78° C and 325 ml of 1.6 M n-butyllithium in hexane was added. After 1 hour of stirring 52 g of methyl isobutyrate was added dropwise followed by stirring for another 30 minutes. Then 63 g of α,α'-dibromo-p-xylene was slowly added. The reaction mixture was stirred overnight and brought to room temperature. The mixture was filtered and solvent was removed from the filtrate by evaporation. The residue was recrystallized from methanol to obtain 63 g of 1,4-bis(2-carbomethoxy-2-methylpropyl)benzene, m.p. 74°-76° C.

Part B

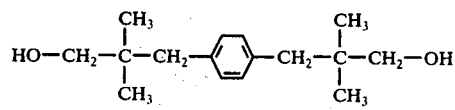

To 500 ml of dry tetrahydrofuran was added 11.4 g of lithium aluminum hydride and 60 g of 1,4-bis(2-carbomethoxy-2-methylpropyl)benzene. The mixture was stirred overnight at room temperature. To the thick reaction mixture was added 300 ml of ethyl acetate, 30 ml of saturated aqueous NH$_4$Cl and 5 ml of concentrated HCl. The mixture was stirred and filtered. Solvent was evaporated from the filtrate and the residue was recrystallized from benzene to obtain 20 g of 1,4-bis(3-hydroxy-2,2-dimethylpropyl)benzene. The solid from the above filtration was slurried with 50 ml of H$_2$O, 20 ml of concentrated HCl and 150 ml of benzene and heated at reflux for 1 hour. The benzene layer was then separated, dried over MgSO$_4$ at 80° C, filtered hot and then cooled to precipitate an additional 10 g of 1,4-bis(3-hydroxy-2,2-dimethylpropyl)benzene, m.p. 104°-105° C.

Part C

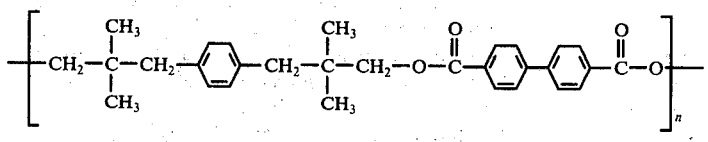

To a glass reactor with nitrogen bleed and sidearm was added 0.048 g of tetraisopropyl titanate, 10.14 g (0.0406 mole) of 1,4-bis(3-hydroxy-2,2-dimethylpropyl)benzene and 15.76 g (0.04 mole) of diphenyl bibenzoate. The resulting mixture under nitrogen at atmospheric pressure was heated for 18 hr at 220° C and 3 hr at 275° C, followed by 3 hr at 275° C at less than 0.05 mm Hg pressure. The resulting poly[oxycarbonyl(1,1'-biphenyl)-4,4'-diylcarbonyloxy(2,2-dimethyl-1,3-propanediyl)(1,4-phenylene)(2,2-dimethyl-1,3-propanediyl)] had a polymer melt temperature above 400° C, an inherent viscosity of 2.20 and was amorphous by X-ray diffraction.

Part D

Polymer from Part C was spun at a spinneret temperature of 350°–375° C at a pressure of 1600 psi, and the fiber was wound up at 200 yd/min. The fiber, after drawing at 3.0× at 150° C and heating at 200° C under restrained conditions at less than 0.01 mm pressure for 18 hr, had a T/E/Mi at room temperature of 12/4/265, a T/E/Mi at 150° C of 7/5/75, an orientation angle of 10°, and was highly crystalline by X-ray diffraction.

Part E

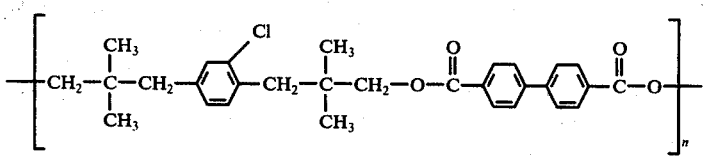

When α,α'-dibromo-2-chloro-p-xylene is substituted for the α,α'-dibromo-p-xylene used in Part A, the intermediate obtained in Part B is 1,4-bis(3-hydroxy-2,2-dimethylpropyl)-2-chlorobenzene, and the polymer obtained in Part C is poly[oxycarbonyl(1,1'-biphenyl)-4,4'-diylcarbonyloxy(2,2-dimethyl-1,3-propanediyl)(3-chloro-1,4-phenylene)(2,2-dimethyl-1,3-propanediyl)].

Part F

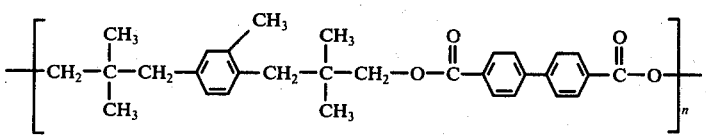

When α,α'-dibromo-2-methyl-p-xylene is substituted for the α,α'-dibromo-p-xylene used in Part A, the intermediate obtained in Part B is 1,4-bis(3-hydroxy-2,2-dimethylpropyl)-2-methylbenzene, and the polymer obtained in Part C is poly[oxycarbonyl(1,1'-biphenyl)-4,4'-diylcarbonyloxy(2,2-dimethyl-1,3-propanediyl)(2-methyl-1,4-phenylene)(2,2-dimethyl-1,3-propanediyl)].

Part G

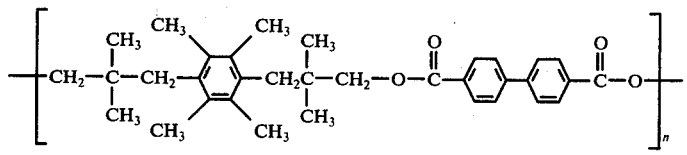

The procedure of Part A above was repeated except that 3,6-bis(chloromethyl)durene was substituted for α,α'-dibromo-p-xylene. The diol obtained in the procedure of Part B was 1,4-bis(2,2-dimethyl-3-hydroxypropyl)tetramethylbenzene (m.p. = 147.5°–195° C from methanol).

Anal. Calcd. for $C_{20}H_{34}O_2$: C, 78.38; H, 11.18. Found: C, 78.76; H, 11.24. C, 78.98; H, 11.16

The infrared spectrum (KBr) contained an OH stretch band at 2.98 μ.

When this diol is substituted for 1,4-bis(3-hydroxy-2,2-dimethylpropyl)benzene in the procedure of Part C above, the polymer obtained is poly[oxycarbonyl(1,1'-biphenyl)-4,4'-diylcarbonyloxy(2,2-dimethyl-1,3-propanediyl)(tetramethyl-1,4-phenylene)(2,2-dimethyl-1,3-propanediyl)].

EXAMPLE 2

Part A

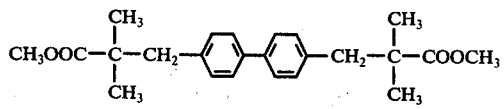

To 900 ml of dry tetrahydrofuran was added 42.0 ml of diisopropylamine. At −78° C 195 ml of 1.6 M n-butyllithium in hexane was added. After 1 hr of stirring, 30.5 g of methyl isobutyrate was added dropwise followed by an additional 30 minutes of stirring. A solution of 51 g of α,α'-dibromo-p,p'-bitolyl in 300 ml of dry tetrahydrofuran was added dropwise. The mixture was stirred overnight and brought to room temperature.

Tetrahydrofuran was removed by evaporation. The residue was dissolved in 300 ml of methylene chloride and washed twice with 300 ml of water. To the milky liquid was added 235 ml of tetrahydrofuran and the water separated out. The organic layer was dried and evaporated to dryness to obtain about 60 g of yellow liquid which crystallized on standing. Drying yielded 48 g of 4,4'-bis(2-carbomethyl-2-methylpropy)biphenyl, m.p. 68°-70° C.

Part B

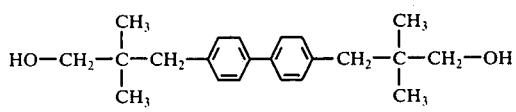

To a solution of 5.94 g of lithium aluminum hydride in 1500 ml of dry tetrahydrofuran, 30 g of 4,4'-bis(2-carbomethoxy-2-methylpropyl)biphenyl was slowly added. The reaction mixture thickened on stirring overnight. Then there was added 150 ml of ethyl acetate, 60 ml of saturated aqueous $NH_4Cl$ and 150 ml of concentrated HCl. After thorough mixing, the solid and liquid were separated by filtration. The filtrate was evaporated to dryness and the residue recrystallized from benzene to obtain 15 g of 4,4'-bis(3-hydroxy-2,2-dimethylpropyl)biphenyl. The solid from the above filtration was slurried with 50 ml of $H_2O$, 10 ml of concentrated HCl and 50 ml of benzene and the mixture was heated at reflux for 1 hr. The benzene layer was separated, dried with $MgSO_4$ at 80° C, filtered hot and then cooled to precipitate an additional 10 g of 4,4'-bis(3-hydroxy-2,2-dimethylpropyl)biphenyl, m.p. 168°-170° C.

Part C

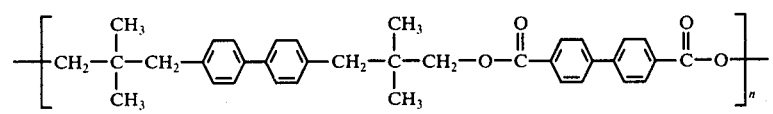

To a glass reactor with a nitrogen bleed and sidearm was added 0.06 g of tetraisopropyl titanate, 16.81 g (0.0513 M) of 4,4'-bis(3-hydroxy-2,2-dimethylpropyl)-biphenyl and 16.4 g (0.05 M) of diphenyl bibenzoate. The resulting mixture under a nitrogen atmosphere was heated for 36 hr at 220° C and 4 hr at 275° C, followed by 3 hr at 275° C and less than 0.05 mm Hg pressure. The resulting poly[oxycarbonyl(1,1'-biphenyl-4,4'-diyl-carbonyloxy(2,2-dimethyl-1,3-propanediyl)(1,1'-biphenyl)-4,4'-diyl(2,2-dimethyl-1,3-propanediyl)] had a PMT of approximately 400° C, an inherent viscosity of 1.10, and showed low crystallinity by X-ray diffraction.

Part D

The polymer from Part C was spun at a spinneret temperature of 350°-375° C and the fiber was wound up at 500 yd/min. The fiber, after being drawn 4.0 times at 180° C, had an orientation angle of 13°, was of medium crystallinity, had a T/E/Mi at room temperature of 11/5/262 and a T/E/Mi at 150° C of 8/5/150.

Part E

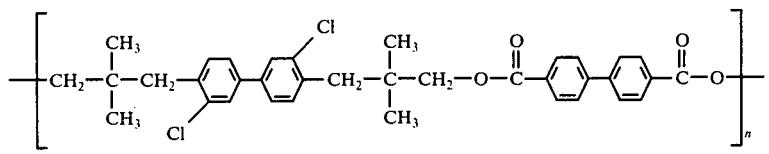

In a 2-liter flask equipped with a reflux condenser capped with a nitrogen bubbler was placed 83.7 g of 3,3'-dichloro-4,4'-bitolyl, 121.5 g of N-bromosuccinimide, 4.0 g of benzoyl peroxide, 630 ml of carbon tetrachloride, and a few boiling chips. The mixture was refluxed for 21½ hours and cooled to room temperature. Four grams of benzoyl peroxide was added and reflux was continued for 8 hours. The mixture was filtered hot and the solid was rinsed on the filter with 500 ml of hot carbon tetrachloride. Cooling the combined filtrate and rinsings gave 75.5 g of crude 3,3'-dichloro-4,4'-bis(bromomethyl)biphenyl melting at 148°-154° C. A recrystallization from chloroform raised the melting point to 159°-161° C.

Anal. Calcd. for $C_{14}H_{10}Cl_2Br_2$: C, 41.11; H, 2.47; Br, 39.08; Cl, 17.34. Found: C, 41.27; H, 2.68; Br, 38.62; Cl, 17.23. C, 41.12; H, 2.57; Br, 38.58; Cl, 17.26

The procedure of Example 2, Part A, was repeated except that 3,3'-dichloro-4,4'-bis(bromomethyl)biphenyl was substituted for α,α'-dibromo-p,p'-bitolyl. The diol obtained in the procedure of Part B was 3,3'-dichloro-4,4'-bis(3-hydroxy-2,2-dimethylpropyl)biphenyl (m.p. = 1.34.75°-135.75° C from chloroform).

Anal. Calcd. for $C_{22}H_{28}Cl_2O_2$: C, 66.83; H, 7.14; Cl, 17.94. Found: C, 66.86; H, 6.73; Cl, 17.40. C, 66.78; H, 7.01; Cl, 17.89

The infrared spectrum (KBr) contained an OH stretch band at 3.00 μ.

When this diol is substituted for 4,4'-bis(3-hydroxy-2,2-dimethylpropyl)biphenyl in the procedure of Example 2, Part C, the polymer obtained is poly[oxycarbonyl(1,1'-biphenyl)-4,4'-diylcarbonyloxy(2,2-dimethyl-1,3-propanediyl)(3,3'-dichloro-1,1'-biphenyl)-4,4'-diyl(2,2-dimethyl-1,3-propanediyl)].

EXAMPLE 3

Part A

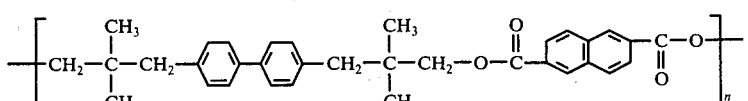

To a glass reactor with a nitrogen bleed and sidearm was added 0.07 g of tetraisopropyl titanate, 18.45 g (0.0615 M) of 4,4'-bis(3-hydroxy-2,2-dimethylpropyl)biphenyl and 22.08 g (0.06 M) of diphenyl 2,6-naphthalenedicarboxylate. The resulting mixture under a nitrogen atmosphere was heated for 36 hr at 220° C and 4 hr at 275° C, followed by 3 hr at 275° C and less than 0.05 mm Hg pressure. The resulting poly[oxycarbonyl-(2,6-naphthalene)diylcarbonyloxy(2,2-dimethyl-1,3-propanediyl)(1,1'-biphenyl)-4,4'-diyl(2,2-dimethyl-1,3-propanediyl)] had a PMT of approximately 400° C, an inherent viscosity of 1.10, and showed low crystallinity by X-ray diffraction.

Part B

The polymer from Part A was spun at a spinneret temperature of 350° to 375° C and the fiber was wound up at 500 yd/min. The fiber, after being drawn 3.5 times at 170° C, had an orientation angle of 14°, was of medium crystallinity, had a T/E/Mi at room temperature of 9/5/260 and a T/E/Mi at 150° C of 6/5/148.

Part C

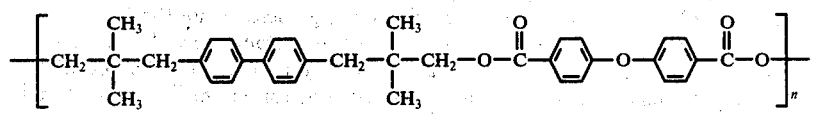

When the diphenyl ester of 4,4'-oxydibenzoic acid is substituted for the diphenyl 2,6-naphthalenedicarboxylate used in Part A, the polymer obtained is poly[oxycarbonyl(1,4-phenyleneoxy-1,4-phenylene)diylcarbonyloxy(2,2-dimethyl-1,3-propanediyl)(1,1'-biphenyl)-4,4'-diyl(2,2-dimethyl-1,3-propanediyl)].

EXAMPLE 4

Part A

To a solution of 56 ml of diisopropylamine in 1200 ml of dry tetrahydrofuran at −78° C was added 260 ml of 1.6 M n-butyllithium in hexane. After 1 hr of stirring, 40.4 g of methyl isobutyrate was added dropwise and the solution was stirred another 30 minutes. A 60-g portion of 2,6-bis(bromomethyl)naphthalene was added slowly, and the reaction mixture was stirred overnight and then brought to room temperature. Tetrahydrofuran was removed by evaporation. The residue was dissolved in 300 ml of CHCl₃, washed 3 times with 400 ml of H₂O, and dried and evaporated to dryness to obtain 56 g of 2,6-bis(2-carbomethoxy-2-methylpropyl)naphthalene, m.p. 108°–110° C. The product was recrystallized from benzene.

Part B

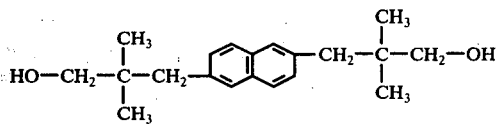

To a solution of 6.0 g of lithium aluminum hydride in 1 liter of dry tetrahydrofuran, 40 g of 2,6-bis(2-carbomethoxy-2-methylpropyl)naphthalene was added slowly. The reaction mixture thickened on stirring overnight. Then there was added 150 ml of ethyl acetate, 60 ml of saturated aqueous NH₄Cl and 150 ml of concentrated HCl. After thorough mixing the solid and liquid were separated by filtration. The filtrate was evaporated to dryness and the residue was recrystallized from benzene to obtain about 20 g of 2,6-bis(3-hydroxy-2,2-dimethylpropyl)naphthalene. The solid from the above filtration was slurried with 50 ml of H₂O, 10 ml of concentrated HCl and 50 ml of benzene and the mixture was heated at reflux for 1 hr. The benzene layer was separated, dried with MgSO₄ at 80° C, filtered hot and then cooled to precipitate about 10 g of 2,6-bis(3-hydroxy-2,2-dimethylpropyl)naphthalene, m.p. 162°–165° C.

Part C

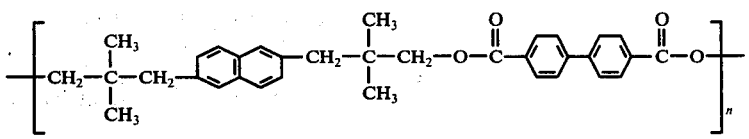

A mixture of 0.006 g of tetraisopropyl titanate, 1.521 g (0.0051 M) of 2,6-bis(3-hydroxy-2,2-dimethylpropyl)naphthalene and 1.970 g (0.005 M) of diphenyl bibenzoate was polymerized using the procedure of Example 2, Part C. The resulting poly[oxycarbonyl(1,1'-biphenyl)-4,4'-diylcarbonyloxy(2,2-dimethyl-1,3-propanediyl)(2,6-naphthalene)diyl(2,2-dimethyl-1,3-propanediyl)] had a PMT of approximately 400° C, could be manually spun into fiber at approximately 365° C, had an inherent viscosity of 0.72, and showed trace crystallinity by X-ray diffraction.

Part D

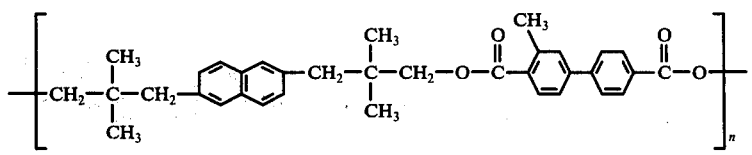

When the diphenyl ester of 2-methyl-4,4'-biphenyldicarboxylic acid is substituted for the diphenyl dibenzoate used in Part C, the polymer obtained is poly[oxycarbonyl(2-methyl-1,1'-biphenyl)-4,4'-diylcarbonyloxy)(2,2-dimethyl-1,3-propanediyl)(2,6-naphthylene)-diyl(2,2-dimethyl-1,3-propanediyl)].

Part E

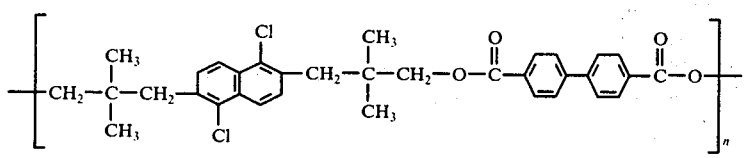

In a 250-ml flask equipped with a reflux condenser capped with a nitrogen T-tube was placed 12.10 g of 1,5-dichloro-2,6-dimethylnaphthalene, 20 g of N-bromosuccinimide, 0.10 g of benzoyl peroxide, 120 ml of carbon tetrachloride and a few boiling chips. The mixture was refluxed for 3 hours and cooled to room temperature. After 0.20 g of α,α'-azobis(isobutyronitrile) was added, refluxing was continued for 16½ hours. After the mixture had cooled to room temperature, the precipitated solid was filtered, rinsed on the filter with carbon tetrachloride and dried. Stirring of this solid for 2½ hours with 400 ml of water, followed by filtration and drying of the solid on the filter, gave 14.03 g of crude 1,5-dichloro-2,6-bis(bromomethyl)naphthalene melting at 219°–221° C. Recrystallization from refluxing toluene raised the melting point to 221°–222.5° C.

Anal. Calcd. for $C_{12}H_8Br_2Cl_2$: C, 37.64; H, 2.10; Br, 41.74; Cl, 18.52. Found: C, 38.11; H, 2.27; Br, 42.40; Cl, 18.04; C, 38.10; H, 2.21; Br, 42.24; Cl, 18.12

The procedure of Example 4, Part A, was repeated except that the above material was substituted for 2,6-bis(bromomethyl)naphthalene. The diol obtained in the procedure of Part B was 1,5-dichloro-2,6-bis(3-hydroxy-2,2-dimethylpropyl)naphthalene (m.p. = 213¾°–214¾° C from alcohol).

Anal. Calcd. for $C_{20}H_{26}Cl_2O_2$: C, 65.04; H, 7.10; Cl, 19.20. Found: C, 65.31; H, 7.14; Cl, 18.91. C, 64.85; H, 7.16; Cl, 18.99 C, 64.95; H, 7.28
The infrared spectrum (KBr) contained an OH stretch band at 3.00 μ.

When this diol is substituted for 2,6-bis(3-hydroxy-2,2-dimethylpropyl)naphthalene in the procedure of Example 4, Part C, the polymer obtained is poly[oxycarbonyl(1,1'-biphenyl)-4,4'-diylcarbonyloxy(2,2-dimethyl-1,3-propanediyl)(1,5-dichloro-2,6-naphthalene)diyl(2,2-dimethyl-1,3-propanediyl)].

Part F

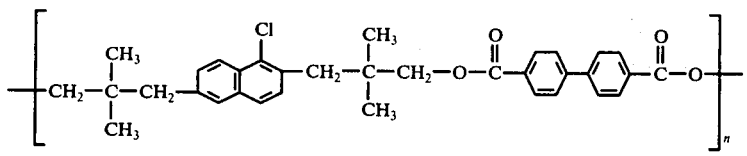

In a 1-liter flask equipped with a reflux condenser capped with a nitrogen T-tube was placed 41.0 g of 1-chloro-2,6-dimethylnaphthalene, 80 g of N-bromosuccinimide, 0.20 g of benzoyl peroxide, 475 ml of carbon tetrachloride and a few boiling chips. The mixture was refluxed for three hours and cooled to room temperature. After 0.30 g of α,α'-azobis(isobutyronitrile) was added, refluxing was continued for 17½ hours. After the mixture had been cooled to room temperature, it was filtered. The solid was rinsed on the filter with carbon tetrachloride and dried. Stirring of this solid with 500 ml of water for 2 hours, followed by filtration, rinsing of the solid on the filter with water, and drying, yielded 30.30 g of crude 1-chloro-2,6-bis(bromomethyl)naphthalene melting at 127°–129° C.

The filtrate from the first filtration was evaporated to 100 ml and refrigerated for several hours. Filtration of the resulting solid, rinsing on the filter with carbon tetrachloride, and drying yielded another 23.80 g of crude 1-chloro-2,6-bis(bromomethyl)naphthalene melting at 120°–128° C. Recrystallization of the combined products from chloroform raised the melting point to 131°–133° C.

Anal. Calc. for $C_{12}H_9Br_2Cl$: C, 41.36; H, 2.60; Br, 45.87; Cl, 10.18 Found: C, 40.28; H, 2.51; Br, 46.96; Cl, 10.53. C, 40.22; H, 2.52; Br, 46.79; Cl, 10.52

The procedure of Example 4, Part A, was repeated except that the above material was substituted for 2,6-bis(bromomethyl)naphthalene. The diol obtained in the procedure of Part B was 1-chloro-2,6-bis(3-hydroxy-2,2-dimethylpropyl)naphthalene (m.p. = 144°–145.5° C).

When this diol is substituted for 2,6-bis(3-hydroxy-2,2-dimethylpropyl)naphthalene in the procedure of Example 4, Part C, the polymer obtained is poly[oxycarbonyl(1,1'-biphenyl)-4,4'-diylcarbonyloxy(2,2-dimethyl-1,3-propanediyl)(1-chloro-2,6-naphthalene)diyl(2,2-dimethyl-1,3-propanediyl)].

EXAMPLE 5

Part A

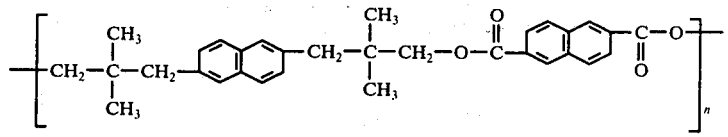

A mixture of 0.006 g of tetraisopropyl titanate, 1.521 g (0.0051 M) of 2,6-bis(3-hydroxy-2,2-dimethylpropyl)naphthalene and 1.840 g (0.005 M) of diphenyl 2,6-naphthalenedicarboxylate was polymerized using the procedure of Example 4, Part C. The resulting poly[oxycarbonyl(2,6-naphthalene)diylcarbonyloxy(2,2-dimethyl- 1,3-propanediyl)(2,6-naphthalene)diyl(2,2-dimethyl-1,3-propanediyl)] had a PMT of approximately 400° C, an inherent viscosity of 1.10, and showed low crystallinity by X-ray diffraction.

Part B

The polymer from Part A was spun at a spinneret temperature of 350°–375° C and the film was wound up at 500 yd/min. The fiber, after being drawn 3.5 times at 170° C, had an orientation angle of 14°, was of medium crystallinity, had a T/E/Mi at room temperature of 9/5/260 and a T/E/Mi at 150° C of 6/5/148.

All the polymers in the preceding examples had values of $n$ in excess of 10.

I claim:

1. The thermally stable, rigid polyesters of the formula

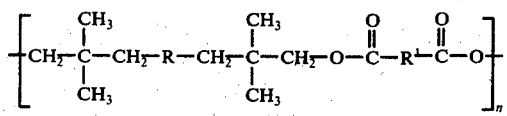

where R is an arylene selected from the group consisting of 1,4-phenylenes, 4,4'-biphenylenes and 2,6-naphthylenes, said arylene being unsubstituted or substituted with halo, lower alkyl or phenyl, $R^1$ is an arylene selected from the group consisting of 1,4-phenylenes, 4,4'-biphenylenes, 4,4'-biphenyleneoxides, and 2,6-naphthylenes, said arylene being unsubstituted or substituted with halo, lower alkyl or phenyl; and $n$ is at least 10.

2. The polyesters of claim 1 in which R is 1,4-phenylene or substituted 1,4-phenylene, and $R^1$ is 4,4'-biphenylene.

3. The polyester of claim 2 in which R is 1,4-phenylene.

4. The polyesters of claim 1 in which R is 4,4'-biphenylene or substituted 4,4'-biphenylene, and $R^1$ is 4,4'-biphenylene.

5. The polyester of claim 4 in which R is 4,4'-biphenylene.

6. The polyester of claim 1 in which R is 4,4'-biphenylene, and $R^1$ is 2,6-naphthylene.

7. The polyesters of claim 1 in which R is 2,6-naphthylene or substituted 2,6-naphthylene, and $R^1$ is 4,4'-biphenylene.

8. The polyester of claim 7 in which R is 2,6-naphthylene.

9. The polyester of claim 1 in which R is 2,6-naphthylene, and $R^1$ is 2,6-naphthylene.

* * * * *